(12) United States Patent
Qin

(10) Patent No.: US 8,937,467 B2
(45) Date of Patent: *Jan. 20, 2015

(54) APPARATUS AND METHODS FOR SWITCHING REGULATOR CURRENT SENSING

(71) Applicant: Analog Devices Technology, Hamilton (BM)

(72) Inventor: Song Qin, Shanghai (CN)

(73) Assignee: Analog Devices Technology, Hamilton (BM)

( * ) Notice: Subject to any disclaimer, the term of this patent is extended or adjusted under 35 U.S.C. 154(b) by 50 days.

This patent is subject to a terminal disclaimer.

(21) Appl. No.: 13/791,210

(22) Filed: Mar. 8, 2013

(65) Prior Publication Data

US 2014/0253089 A1    Sep. 11, 2014

(51) Int. Cl.
*G05F 1/40*    (2006.01)
*G05F 3/02*    (2006.01)

(52) U.S. Cl.
CPC .................................. *G05F 3/02* (2013.01)
USPC ........................................................ 323/282

(58) Field of Classification Search
CPC .... H02M 3/156; H02M 3/157; H02M 3/1588
USPC ......................................... 323/282–285, 351
See application file for complete search history.

(56) References Cited

U.S. PATENT DOCUMENTS

| 7,106,042 | B1* | 9/2006 | Jackson | 323/316 |
| 7,319,314 | B1* | 1/2008 | Maheshwari et al. | 323/313 |
| 7,336,085 | B2 | 2/2008 | Fabbro et al. | |
| 7,365,559 | B2 | 4/2008 | Colbeck | |
| 8,080,984 | B1* | 12/2011 | Geynet | 323/280 |
| 8,159,204 | B2* | 4/2012 | Grant | 323/285 |
| 8,373,398 | B2* | 2/2013 | Kim | 323/271 |
| 8,680,836 | B2* | 3/2014 | Grant | 323/285 |
| 2004/0189351 | A1 | 9/2004 | Tai et al. | |
| 2006/0255783 | A1 | 11/2006 | Chapuis | |
| 2013/0293986 | A1* | 11/2013 | Lerner et al. | 361/18 |
| 2014/0009190 | A1* | 1/2014 | Chao | 327/109 |

* cited by examiner

*Primary Examiner* — Adolf Berhane
(74) *Attorney, Agent, or Firm* — Knobbe Martens Olson & Bear LLP

(57) ABSTRACT

Apparatus and methods for current sensing in switching regulators are provided. In certain implementations, a switching regulator includes a switch transistor, a replica transistor, a sense resistor, and a current sensing circuit. The drain and gate of the switch transistor can be electrically connected to the drain and gate of the replica transistor, respectively. The current sensing circuit can generate an output current that varies in response to a sense current from a source of the replica transistor. Additionally, the current sensing circuit can sink the sense current when the sense current flows from the drain to the source of the replica transistor and source the sense current when the sense current flows from the source to the drain of the replica transistor. The sense resistor can receive the output current such that the voltage across the sense resistor changes in relation to the current through the switch transistor.

20 Claims, 6 Drawing Sheets

APPARATUS AND METHODS FOR SWITCHING REGULATOR CURRENT SENSING

CROSS-REFERENCE TO RELATED APPLICATIONS

This application is related to U.S. application Ser. No. 13/791,234, entitled "APPARATUS AND METHODS FOR BIDIRECTIONAL CURRENT SENSING IN A SWITCHING REGULATOR" (Inventor: Song Qin, filed on even date herewith), the disclosure of which is incorporated herein by reference in its entirety.

BACKGROUND

1. Field

Embodiments of the invention relate to electronic devices, and more particularly, to switching regulators.

2. Description of the Related Technology

A switching regulator can be used to generate a regulated voltage by controlling a current provided to a load through an inductor. For example, the switching regulator can include one or more switches that are turned on and off to control a current into or out of the inductor. The duty cycle and/or timing of the switches can control the voltage level of the regulated voltage. Examples of switching regulators include, for example, buck converters and boost converters.

A switching regulator can include current sensing or observation circuitry to sense the current through one or more of the regulator's switches, thereby sensing the current provided to the load through the inductor. The sensed switch current can be used to provide enhanced control over switching operations in the regulator.

There is a need for improved current sensing circuits in switching regulators.

SUMMARY

In one embodiment, an apparatus includes a first switch transistor, a replica transistor, and a current sensing circuit. The first switch transistor includes a drain, a source, and a gate. The source is electrically connected to a first supply voltage, and the gate is electrically connected to a first control signal. The replica transistor includes a drain, a source, and a gate. The drain of the replica transistor is electrically connected to the drain of the first switch transistor, and the gate of the replica transistor is electrically connected to the first control signal. The replica transistor is a replica of the first switch transistor. The current sensing circuit is electrically connected to the source of the replica transistor. The current sensing circuit is configured to control a voltage of the source of the replica transistor such that a sense current through the replica transistor varies in response to a switch current through the first switch transistor. The current sensing circuit is further configured to source the sense current to generate a first current that varies in response to the switch current when the switch current has a first polarity. The current sensing circuit is further configured to sink the sense current to generate a second current that varies in response to the switch current when the switch current has a second polarity opposite the first polarity.

In another embodiment, a method of current sensing in a switching regulator is provided. The method includes controlling a first switch transistor using a first control signal. The first switch transistor includes a drain, a source electrically connected to a first supply voltage, and a gate electrically connected to the first control signal. The method further includes controlling a voltage of a source of a replica transistor using a current sensing circuit. The replica transistor includes a drain electrically connected to the drain of the first switch transistor and a gate electrically connected to the gate of the first switch transistor. The method further includes sourcing a sense current through the replica transistor using the current sensing circuit when a switch current through the first switch transistor has a first polarity. The method further includes generating a first current using the current sensing circuit. The first current varies in response to the switch current when the switch current has the first polarity. The method further includes sinking the sense current using the current sensing circuit when the switch current has a second polarity opposite the first polarity. The method further includes generating a second current using the current sensing circuit. The second current varies in response to the switch current when the switch current has the second polarity.

In another embodiment, an apparatus includes a first switch transistor, a replica transistor, and a current sensing circuit. The first switch transistor includes a drain, a source, and a gate. The source is electrically connected to a first supply voltage, and the gate is electrically connected to a first control signal. The replica transistor includes a drain, a source, and a gate. The drain of the replica transistor is electrically connected to the drain of the first switch transistor, and the gate of the replica transistor is electrically connected to the first control signal. The replica transistor is a replica of the first switch transistor. The current sensing circuit includes a first feedback circuit, a first load, a second load, and a second feedback circuit. The first feedback circuit is configured to generate a first current to control a voltage of the source of the replica transistor when a switch current through the first switch transistor has a first polarity. The first feedback circuit is further configured to control the voltage of the source of the replica transistor to at least approximately match a voltage of the first supply voltage when the switch current has the first polarity. The first feedback current is further configured to source a sense current through the replica transistor when the switch current has the first polarity. The first load includes a first end electrically connected to the source of the replica transistor and a second end electrically connected to the first supply voltage. The first load is configured to sink the sense current when the switch current has a second polarity opposite the first polarity. The second load has a predetermined scale relative to the first load. The second load includes a first end and a second end, and the second end is electrically connected to the first supply voltage. The second feedback circuit is configured to generate a second current to drive the second load with a buffered version of the voltage of the source of the replica transistor. The current sensing circuit is further configured to combine a first signal associated with the first current and a second signal associated with the second current such that the switch current is sensed bidirectionally.

DETAILED DESCRIPTION OF EMBODIMENTS

Figure 1:
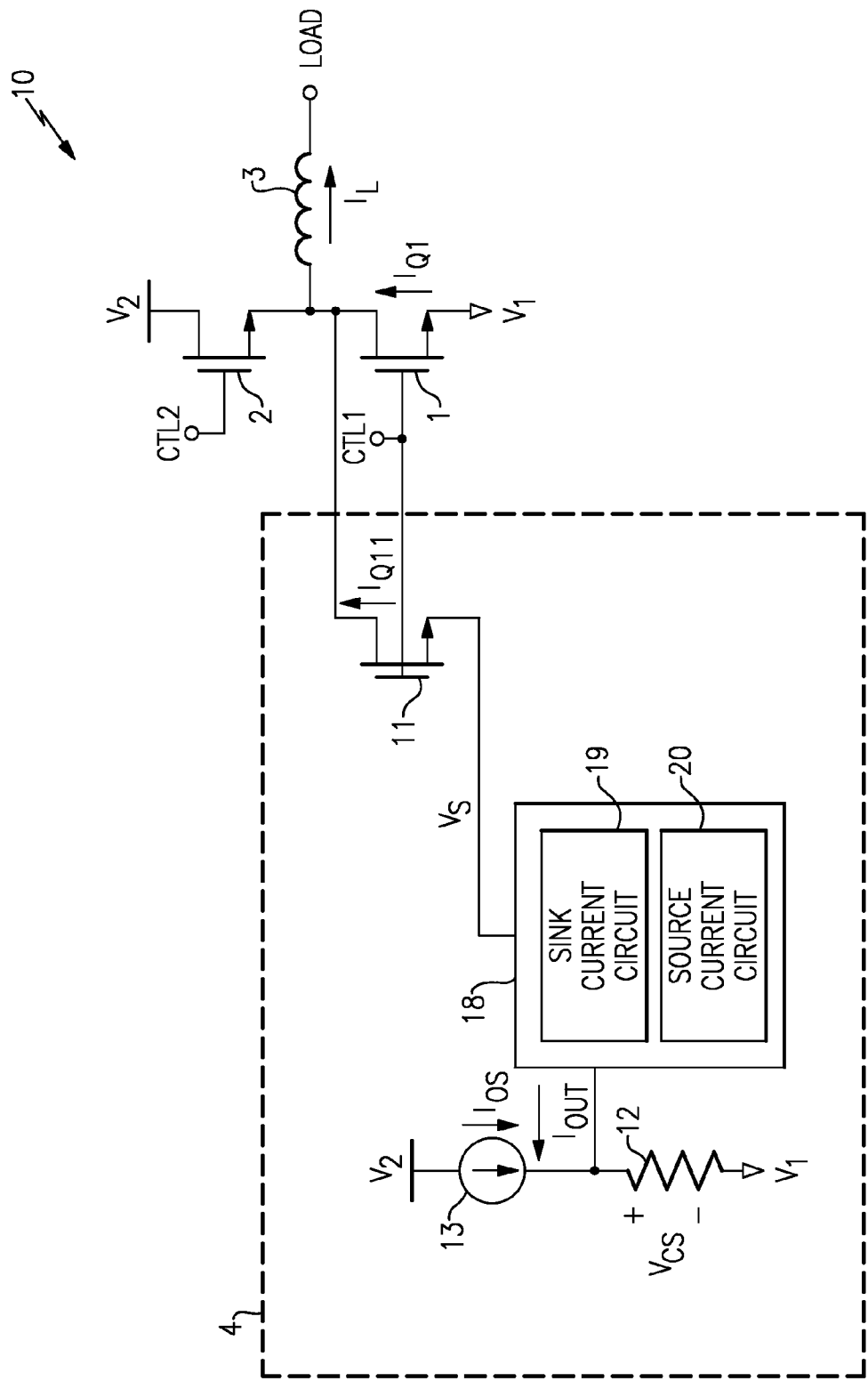
FIG. 1 is a circuit diagram of one embodiment of a switching regulator.

The following detailed description of embodiments presents various descriptions of specific embodiments of the invention. However, the invention can be embodied in a multitude of different ways as defined and covered by the claims. In this description, reference is made to the drawings where like reference numerals may indicate identical or functionally similar elements.

Overview of Current Sensing Circuits in Switching Regulators

To sense a current through a switch transistor of a switching regulator, a replica transistor can be used to generate a sensed current that changes based on the current through the switch transistor. For example, the replica transistor can have a gate and a drain electrically connected to a gate and a drain of the switch transistor, respectively, and a drain-to-source current ($I_{DS}$) of the replica transistor can be used to generate the sensed current. In one embodiment, the replica transistor is a replica of the switch transistor such that, except for a possible difference in width, the replica transistor has about the same characteristics as the switch transistor.

The difficulty of current sensing in switching regulators can be exacerbated in configurations in which the polarity of the switch transistor's current changes over time. For example, the polarity of the switch current can be positive or negative depending on the regulator's load conditions. For instance, the switch current can be positive or from the source to the drain of the switch transistor for a relatively large or heavy current load, but can be negative or from the drain to the source at certain time instances for a relatively small or light current load. The positive and negative current polarities can lead to operating conditions in which the voltage of the drain of the switch transistor can be either above or below a power low or ground supply voltage of the switching regulator. Such operating conditions can complicate current sensing.

Additionally, current sensing can be further complicated when the switching regulator is fabricated using certain manufacturing processes. For example, when the switch transistor and the replica transistor are implemented as vertical diffusion metal oxide semiconductor (DMOS) transistors, the drains of the switch transistor and the replica transistor can be inherently connected in some manufacturing processes and/or layout implementations. Such inherent electrical connections can further constrain a current sensing circuit.

Apparatus and methods for current sensing in switching regulators are provided. In certain implementations, a switching regulator includes a switch transistor, a replica transistor, a current source, a sense resistor, and a current sensing circuit. The drain and gate of the switch transistor can be electrically connected to the drain and gate of the replica transistor, respectively. The current sensing circuit can generate an output current that varies in response to a sense current from a source of the replica transistor. Additionally, the current sensing circuit can control the voltage of the source of the replica transistor such that the sense current is a replica of a switch current through the switch transistor. The current sensing circuit can include a sink current circuit for sinking the sense current when the sense current flows from the drain to the source of the replica transistor and a source current circuit for sourcing the sense current when the sense current flows from the source to the drain of the replica transistor. The sense resistor can receive an offset current from the current source and the output current from the current sensing circuit such that the voltage across the sense resistor changes in relation to the current through the switch transistor.

Configuring the current sensing circuit to include circuitry for sinking and sourcing the sense current through the replica transistor can aid in sensing the switch transistor's switch current even when the drain voltage of the switch transistor transitions between voltages above and below that of the switching regulator's power low or ground supply.

The current sensing circuits described herein can be used to sense bidirectional currents through a switch transistor in a switching regulator. Additionally, the current sensing circuits can be configured to provide relatively robust switch current observations near current transition regions in which the switch current's polarity transitions from positive to negative or from negative to positive.

FIG. 1 is a schematic diagram of one embodiment of a switching regulator 10. The switching regulator 10 includes a first switch transistor 1, a second switch transistor 2, an inductor 3, and a current sensing block 4. The current sensing block 4 includes a replica transistor 11, a sense resistor 12, a first current source 13, and a current sensing circuit 18. The illustrated current sensing circuit 18 includes a sink current circuit 19 and a source current circuit 20.

The first switch transistor 1 includes a gate configured to receive a first control signal CTL1, a source electrically connected to a first or power low supply voltage $V_1$, and a drain electrically connected to a first end of the inductor 3, to a source of the second switch transistor 2, and to a drain of the replica transistor 11. The inductor 3 further includes a second end electrically connected to a load terminal LOAD. The second switch transistor 2 further includes a gate configured to receive a second control signal CTL2 and a drain electrically connected to a second or power high supply voltage $V_2$. The replica transistor 11 further includes a gate configured to receive the first control signal CTL1. The current sensing circuit 18 includes a first terminal electrically connected to the source of the replica transistor 11. The first current source 13 is electrically connected between the second supply voltage $V_2$ and a second terminal of the current sensing circuit 18. The sense resistor 12 is electrically connected between the second terminal of the current sensing circuit 18 and the first supply voltage $V_1$. The first current source 13 is configured to generate a first or offset current $I_{OS}$, and the current sensing circuit 18 is configured to generate an output current $I_{OUT}$.

The first and second control signals CTL1, CTL2 can be used to turn on and off the first and second switch transistors 1, 2 to generate a regulated voltage on the load terminal LOAD by controlling an inductor current $I_L$ through the inductor 3. In certain implementations, the first and second control signals CTL1, CTL2 can be used to regularly switch the state of the first and second switch transistors 1, 2 between a first phase of the switching regulator 10 and a second phase of the switching regulator 10. For example, during the first phase of the switching regulator 10, the first switch transistor 1 can be off, and the second switch transistor 2 can be on to increase or build up the magnetic field of the inductor 3 by providing a current from the second supply voltage $V_2$ to the load terminal LOAD through the inductor 3. Additionally, during the second phase of the switching regulator 10, the first switch transistor 1 can be on, and the second switch transistor 2 can be off such that inductor's magnetic field operates to provide a current from the first supply voltage $V_1$ to the load terminal LOAD.

Although the switching regulator 10 has been described as operating over two phases, the switching regulator 10 can operate in other ways. For example, in one embodiment, the switching regulator 10 is switched between the first phase, the second phase, and a third phase associated with turning off the first and second switch transistors 1, 2. Configuring the switching regulator 10 in this manner can aid in controlling the voltage level of the regulated voltage generated on the load terminal LOAD when the current loading of the load terminal LOAD is relatively small or light. Although not illustrated in FIG. 1 for clarity, the switching regulator 10 can include switch control circuitry for generating the first and second control signals CTL1, CTL2. In certain implementations, the switch control circuitry can be configured to operate based in part on a current sensed by the current sensing block 4.

The current sensing block 4 can be used to sense a switch current $I_{Q1}$ of the first switch transistor 1, and thus can be used to sense the inductor current $I_L$ through the inductor 3 when the first switch transistor 1 is on, and the second switch transistor 2 is off. For example, the sense resistor 12 has been configured to receive the offset current $I_{OS}$ from the first current source 13 and the output current $I_{OUT}$ from the current sensing circuit 18. Additionally, the current sensing circuit 18 can control the magnitude of the output current $I_{OUT}$ to change or vary with the switch current $I_{Q1}$, such that a voltage $V_{CS}$ across the sense resistor 12 changes in relation to the switch current $I_{Q1}$. Thus, the current sensing block 4 can sense the inductor current $I_L$ by changing the voltage $V_{CS}$ across the sense resistor 12 in relation to the inductor current $I_L$ when the first switch transistor 1 is on and the second switch transistor 2 is off. Although FIG. 1 illustrates the output current $I_{OUT}$ flowing into the sense resistor 12, the output current $I_{OUT}$ can have either a positive or negative polarity depending on the polarity of the switch current $I_{Q1}$. Thus, the output current $I_{OUT}$ can flow into or out of the sense resistor 12 as the switch current $I_{Q1}$ changes.

Although FIG. 1 illustrates the current sensing block 4 in the context of a switching regulator implemented in a buck converter configuration, the teachings herein are applicable to other implementations of switching regulators, including, for example, boost converter configurations. Thus, the teachings herein are applicable to switching converters that generate not only a buck or step down voltage, but also to switching converters that generate a boost or step up voltage.

As shown in FIG. 1, the first switch transistor 1 can generate the switch current $I_{Q1}$ and the replica transistor 11 can generate a sense current $I_{Q11}$. In certain implementations, the replica transistor 11 is scaled in size or drive strength relative to the first switch transistor 1. For example, when the drain-to-source voltages of the first switch transistor 1 and the replica transistor 11 are about equal, and the first switch transistor 1 is implemented to be a factor of about N times a width of the replica transistor 11, the switch current $I_{Q1}$ can be about equal to $N*I_{Q11}$. In one embodiment, N is selected to be in the range of about 100 to about 100,000. However, other configurations are possible.

As will be described in detail further below, in certain implementations the current sensing circuit 18 can be used to control the source voltage $V_S$ of the replica transistor 11 to be relatively near or close to the source voltage of the first switch transistor 1 such that the drain-to-source voltages of the replica transistor 11 and the first switch transistor 1 are about equal. Additionally, the current sensing circuit 18 can include the source current circuit 20 for sourcing the sense current $I_{Q11}$ when the sense current $I_{Q11}$ is positive or flowing from the source to drain of the replica transistor 11. Additionally, the current sensing circuit 18 can include the sink current circuit 19 for sinking the sense current $I_{Q11}$ when the sense current $I_{Q11}$ is negative or flowing from the drain to source of the replica transistor 11. By sourcing or sinking the sense current $I_{Q11}$ in this manner, the current sensing circuit 18 can sense both positive and negative values of the switch current $I_{Q1}$, even when the voltage of the drain of the first switch transistor 1 changes between voltage levels above and below the first supply voltage $V_1$ over time.

The output current $I_{OUT}$ generated by the current sensing block 4 can be based on the sense current $I_{Q11}$ through the replica transistor 11. For example, in certain implementations the output current $I_{OUT}$ is controlled to be about equal to the sense current $I_{Q11}$ multiplied by a scaling factor, which can be greater than, less than, or equal to 1.

The sense resistor 12 is configured to receive the output current $I_{OUT}$, and thus the voltage $V_{CS}$ across the sense resistor 12 can change in relation to the switch current $I_{Q1}$. The sense resistor 12 has also been configured to receive an offset current $I_{OS}$ from the first current source 13. Configuring the sense resistor 12 to receive the offset current $I_{OS}$ can aid in generating a positive voltage $V_{CS}$ even when the output current $I_{OUT}$ has a negative amplitude.

In certain implementations, the first and second switch transistors 1, 2 and the replica transistor 11 are implemented as metal oxide semiconductor (MOS) transistors, such as vertical DMOS transistors. As used herein and as persons having ordinary skill in the art will appreciate, MOS transistors can have gates made out of materials that are not metals, such as polysilicon, and can have dielectric regions implemented not just with silicon oxide, but with other dielectrics, such as high-k dielectrics.

In FIG. 1, the first and second switch transistors 1, 2 and the replica transistor 11 are illustrated as n-type MOS (NMOS) transistors. However, the teachings herein are applicable to configurations using p-type MOS (PMOS) transistors and/or configurations using a combination of NMOS and PMOS transistors. For example, in certain implementations, the first switch transistor 1 can be implemented as an NMOS transistor and the second switch transistor 2 can be implemented as a PMOS transistor.

The sense resistor 12 can be implemented using a variety of configurations. For example, in certain implementations, the sense resistor 12 is implemented using passive structures, such as polysilicon structures. However, other configurations are possible, such as implementations in which the sense resistor 12 is implemented using active devices such as transistors biased to provide a desired resistance.

In one embodiment, the first and second switch transistors 1, 2 and the current sensing block 4 are implemented on an integrated circuit (IC), and the inductor 3 is implemented external to the IC. However, other configurations are possible.

Figure 2:
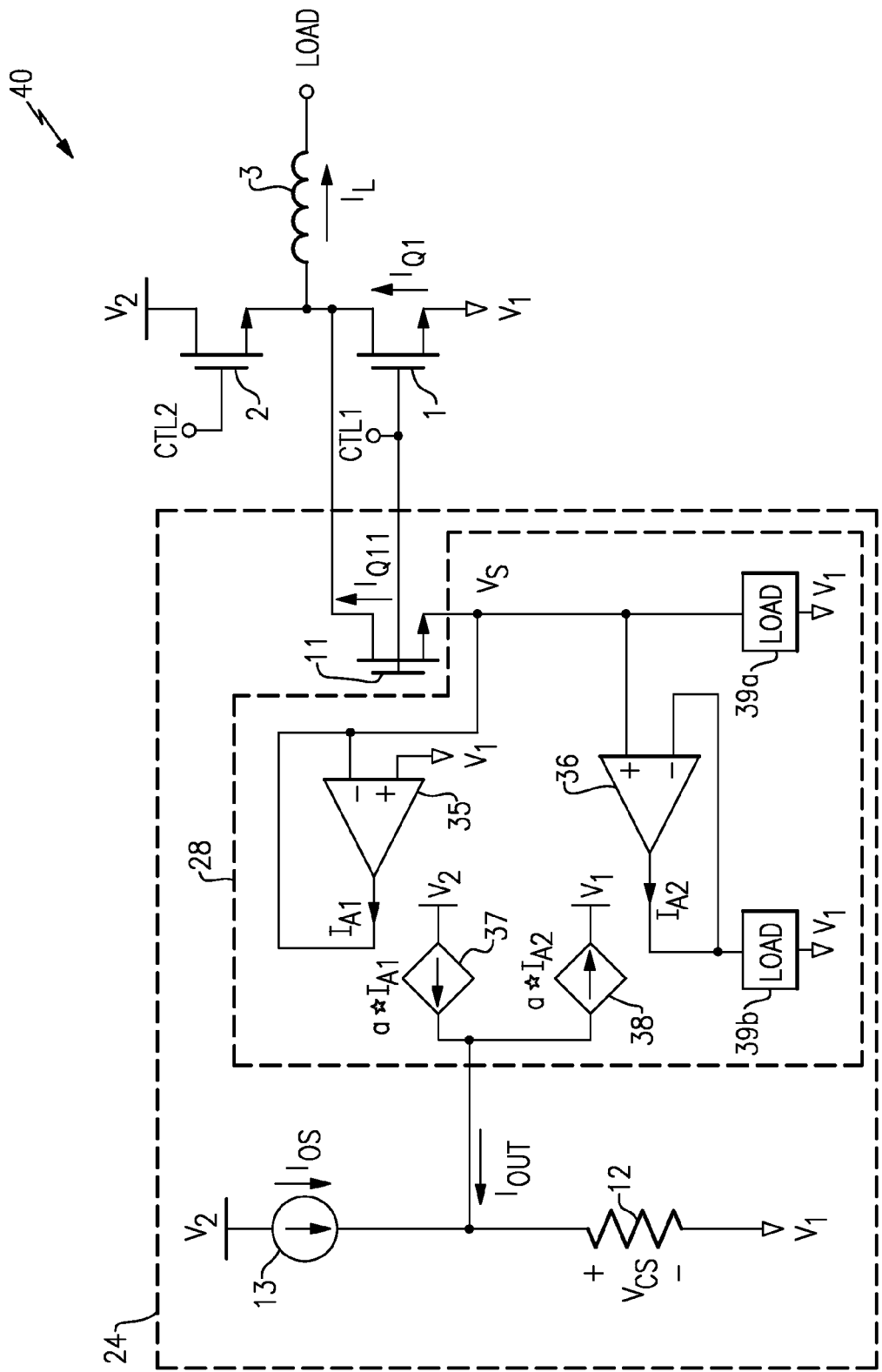
FIG. 2 is a circuit diagram of another embodiment of a switching regulator.

FIG. 2 is a circuit diagram of another embodiment of a switching regulator 40. The switching regulator 40 includes the first and second switch transistors 1, 2, the load inductor 3, and a current sensing block 24. The current sensing block 24 includes the replica transistor 11, the sense resistor 12, the first current source 13, and a current sensing circuit 28. The current sensing circuit 28 includes a first amplifier 35, a second amplifier 36, a second current source 37, a third current source 38, and first and second load circuits 39a, 39b.

The first amplifier 35 includes a non-inverting input electrically connected to the first supply voltage $V_1$ and an inverting input and an output electrically connected to the source of the replica transistor 11. The second amplifier 36 includes a non-inverting input electrically connected to the source of the replica transistor 11 and to a first terminal of the first load circuit 39a. The first load circuit 39a further includes a second terminal electrically connected to the first supply voltage $V_1$.

The second amplifier 36 further includes an inverting input and an output electrically connected to a first terminal of the second load circuit 39b. The second load circuit 39b further includes a second terminal electrically connected to the first supply voltage $V_1$. The first and second current sources 13, 37 are each electrically connected between the second supply voltage $V_2$ and a first end of the sense resistor 12. The third current source 38 is electrically connected between the first supply voltage $V_1$ and the first end of the sense resistor 12. The sense resistor 12 further includes a second end electrically connected to the first supply voltage $V_1$. Although FIG. 2 illustrates a configuration in which the first and second current sources 13, 37 are powered using the second supply voltage $V_2$ and the third current source is powered using the first supply voltage $V_1$, other configurations are possible. For example, in one embodiment the first current source 13 is connected between the first end of the sense resistor 12 and an internal voltage reference, such as a regulated voltage generated by a low drop out (LDO) regulator.

The first and second amplifiers 35, 36 are configured to operate with negative feedback. For example, the output of the first amplifier 35 is electrically connected to the inverting input of the first amplifier 35, and the output of the second amplifier 36 is electrically connected to the inverting input of the second amplifier 36. Configuring the first and second amplifiers 35, 36 in this manner can result in each amplifier controlling the voltage of the amplifier's inverting input to be about equal to the amplifier's non-inverting input.

However, as will be described in detail further below, the negative feedback loop associated with the first amplifier 35 can be configured to be inactive when the sense current $I_{Q11}$ is negative or flowing from the drain to source of the replica transistor 11, while the negative feedback loop associated with the second amplifier 36 can be configured to be inactive when the sense current $I_{Q11}$ is positive of flowing from the source to drain of the replica transistor 11. Configuring the first and second amplifiers 35, 36 in this manner allows the first amplifier output current $I_{A1}$ to change in response to the switch current $I_{Q1}$ when the switch current $I_{Q1}$ is positive, and for the second amplifier output current $I_{A2}$ to change in response to the switch current $I_{Q1}$ when the switch current $I_{Q1}$ is negative.

The second and third current sources 37, 38 can operate as current-controlled current sources that generate currents that change in relation to the first and second amplifier output currents $I_{A1}$, $I_{A2}$, respectively. For example, the second current source 37 can generate a current about equal to $\alpha * I_{A1}$ and the third current source 38 can generate a current about equal $a * I_{A2}$, where $\alpha$ is a scaling factor, which can be, for example, greater than, less than, or equal to 1. The currents generated by the first to third current sources 13, 37, 38 can be summed and provided to the sense resistor 12 to generate a voltage $V_{CS}$ across the sense resistor 12 that changes in response to the inductor current $I_L$ when the first switch transistor 1 is turned on and the second switch transistor 2 is turned off. In certain implementations, the second and third current sources 37, 38 can be implemented using current mirrors that mirror the output currents of the first and second amplifiers 35, 36, respectively. However, other configurations are possible.

In the illustrated configuration, the second and third current sources 37, 38 have opposite polarity. The currents from the second and third current sources 37, 38 can be summed to generate an output current $I_{OUT}$ which can be about equal to $\alpha * (I_{A1} - I_{A2})$. The output current $I_{OUT}$ can be added to the offset current $I_{OS}$ generated by the first current source 13, and provided to the sense resistor 12. Accordingly, the voltage $V_{CS}$ across the sense resistor 12 can be about equal to $R * (I_{OUT} + I_{OS})$, where R is the resistance of the sense resistor 12 and $I_{OS}$ is the offset current generated by the first current source 13.

As will be described below, the voltage $V_{CS}$ across the sense resistor 12 can change in relation to the switch current $I_{Q1}$, even when the switch current $I_{Q1}$ has an amplitude that changes between positive and negative current amplitudes over time.

The first output amplifier current $I_{A1}$ generated by the first amplifier 35 can change in relation to the switch current $I_{Q1}$ when the switch current $I_{Q1}$ is positive or flowing from source to drain of the first switch transistor 1, but can have a relatively small magnitude when the switch current $I_{Q1}$ is negative or flowing from drain to source of the first switch transistor 1. In one embodiment, the first and second amplifiers 35, 36 are powered from the second supply voltage $V_2$ and the first supply voltage $V_1$ or from the regulated output voltage and the first supply voltage $V_1$. For example, when the switch current $I_{Q1}$ is positive, the first amplifier 35 can source current to control a voltage $V_S$ of the first amplifier's inverting input terminal to be about equal to $V_1$, where $V_1$ is the voltage level of the first supply voltage $V_1$. The current sourced by the first amplifier 35 in this condition can be about equal to the sense current $I_{Q11}$ through the replica transistor 11. However, sinking current can be difficult when a node is near the first supply voltage $V_1$ such that when the switch current $I_{Q1}$ is negative, the first amplifier 35 can have insufficient voltage headroom to sink current, and thus the feedback loop around the first amplifier 35 can be inoperable to match the first output amplifier current $I_{A1}$ with the sense current $I_{Q11}$. Thus, when the switch current $I_{Q1}$ is negative, the first output amplifier current $I_{A1}$ can be relative small, such as a magnitude of about 0 mA. Accordingly, the first output amplifier current $I_{A1}$ can change in relation to the switch current $I_{Q1}$ when the switch current $I_{Q1}$ is positive, but can have a relatively small magnitude when the switch current $I_{Q1}$ is negative.

Additionally, the second output amplifier current $I_{A2}$ generated by the second amplifier 36 can change in relation to the switch current $I_{Q1}$ when the switch current $I_{Q1}$ is negative, but can have a relatively small magnitude when the switch current $I_{Q1}$ is positive. For example, when the switch current $I_{Q1}$ is negative, the sense current $I_{Q11}$ can flow through the replica transistor 11 and through the first load circuit 39a, thereby generating a voltage $V_S$ at the non-inverting input of the second amplifier 36. Additionally, the second amplifier 36 can source current into the second load circuit 39b to control a voltage of the second amplifier's inverting input to be about equal to the voltage of the second amplifier's non-inverting input $V_S$. The ratio of the second output amplifier current $I_{A2}$ to the sense current $I_{Q11}$ can be controlled based on a ratio of resistance between the first and second load circuits 39a, 39b. Accordingly, the second output amplifier current $I_{A2}$ can have a magnitude that changes in relation to the switch current $I_{Q1}$ when the switch current $I_{Q1}$ is negative. However, when the switch current $I_{Q1}$ is positive, the voltage $V_S$ at the non-inverting input should be about equal to $V_1$ due to the operation of the feedback loop around the first amplifier 35, which then due to the operation of the feedback loop around the second amplifier 36 is also the approximate voltage at the output and the inverting input of the second amplifier 36. Since the voltage $V_1$ is at both ends of the second load circuit 39b, the current output amplifier current $I_{A2}$ is approximately 0 when the switch current $I_{Q1}$ is positive.

Accordingly, the first output amplifier current $I_{A1}$ can change in response to the switch current $I_{Q1}$ when the switch current $I_{Q1}$ is positive, and the second output amplifier current $I_{A2}$ can change in response to the switch current $I_{Q1}$ when the switch current $I_{Q1}$ is negative. Additionally, the second and third current sources 37, 38 can generate currents proportional to the first and second output amplifier currents $I_{A1}$, $I_{A2}$, respectively, which can be summed to generate an output current $I_{OUT}$ that flows into or out of the sense resistor 12 to control the voltage $V_{CS}$ across the sense resistor 12. Accordingly, the voltage $V_{CS}$ can change in relation to the switch current and thus also in relation to the inductor current $I_L$ when the first switch transistor 1 is turned on and the second switch transistor 2 is turned off.

The first and second load circuits 39a, 39b can be implemented using a variety of configurations. For example, in certain implementations, the first and second load circuits 39a, 39b can be implemented using passive structures, such as polysilicon resistors. However, other configurations are possible, such as implementations in which the first and second load circuits 39a, 39b are implemented using active devices, such as transistors biased to achieve a desired resistance.

The current through the sense resistor 12 can be equal to a sum of the currents of the first to third current sources 13, 37-38. However, as shown in FIG. 2, the polarity of the third current source 38 can be opposite the polarity of the first and second current sources 13, 37. Accordingly, in certain implementations, the voltage $V_{CS}$ across the sense resistor 12 can be given by equation 1 below, where a is the scaling factor of the second and third current sources 37, 38, R is the resistance of the sense resistor 12, and $I_{OS}$ is the current of the first current source 13.

$$V_{CS} \sim = R*[I_{OS} + a*I_{A1} - a*I_{A2}] \quad \text{Equation 1}$$

As described earlier, when the switch current $I_{Q1}$ is positive, the first amplifier 35 can control can control the source voltage $V_S$ to be about equal to the voltage of the first supply voltage $V_1$ such that the drain-to-source voltages of the first switch transistor 1 and the replica transistor 11 are about equal. Accordingly, in certain implementations, the sense current $I_{Q11}$ of the replica transistor 11 is given by equation 1 below, where N is the scaling ratio between the first switch transistor 1 and the replica transistor 11. Additionally, in certain implementations, when the switch current $I_{Q1}$ is positive, the second amplifier current $I_{A2}$ can be about equal to 0 mA, the first amplifier current $I_{A1}$ can be about equal to the sense current $I_{Q11}$ of the replica transistor 11, and the voltage $V_{CS}$ of the sense resistor 12 can be given by equation 3 below.

$$I_{Q11} \sim = \frac{I_{Q1}}{N}, \text{ for } I_{Q1} > 0 \quad \text{Equation 2}$$

$$V_{CS} \sim = R*\left[I_{OS} + a*\left(\frac{I_{Q1}}{N}\right)\right], \text{ for } I_{Q1} > 0 \quad \text{Equation 3}$$

Additionally, when the switch current $I_{Q1}$ is negative, the negative feedback loop associated with the second amplifier 36 can control the voltage of the second amplifier's non-inverting input to be about equal to the voltage of the second amplifier's inverting input. In certain configurations, the resistance of the first load circuit 39a is configured to be relatively small compared to the channel resistance of the replica transistor 11 such that the drain-to-source voltages of the first switch transistor 1 and the replica transistor 11 are about equal when the switch current $I_{Q1}$ is negative. Thus, in certain implementations, the sense current $I_{Q11}$ of the replica transistor 11 is given by equation 4 below when the switch current $I_{Q1}$ is negative. Additionally, in certain implementations, when the switch current $I_{Q1}$ is negative, the first amplifier current $I_{A1}$ can be about equal to 0 mA, the resistances of the first and second load circuits 39a, 39b can be configured to be about equal, and the voltage $V_{CS}$ of the sense resistor 12 can be given by equation 5 below.

$$I_{Q11} \sim = \frac{I_{Q1}}{N}, \text{ for } I_{Q1} < 0 \quad \text{Equation 4}$$

$$V_{CS} \sim = R*\left[I_{OS} - a*\left(\frac{|I_{Q1}|}{N}\right)\right], \text{ for } I_{Q1} < 0 \quad \text{Equation 5}$$

As shown by equations 3 and 5 above, the voltage $V_{CS}$ across the sense resistor 12 can be configured to be in a linear relationship with the switch current $I_{Q1}$ of the first switch transistor 1. Since the switch current $I_{Q1}$ of the first switch transistor 1 can change with the inductor current $I_L$ when the first control signal CTL1 is enabled, the voltage $V_{CS}$ can be used sense the inductor current $I_L$. The current sensing block 24 can be used to sense bidirectional switch currents and can provide a relatively smooth transition between positive and negative current sensing.

Figure 3B:
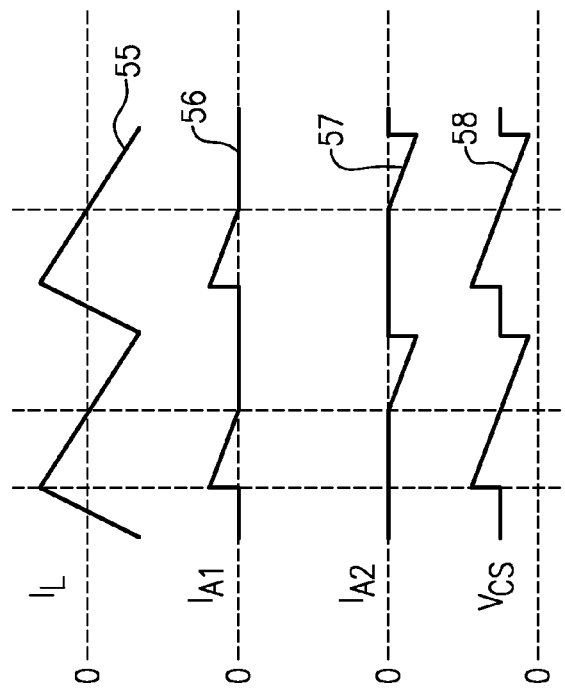
FIGS. 3A and 3B are graphs of voltage and current versus time for one implementation of the switching regulator of FIG. 2.
Figure 3A:
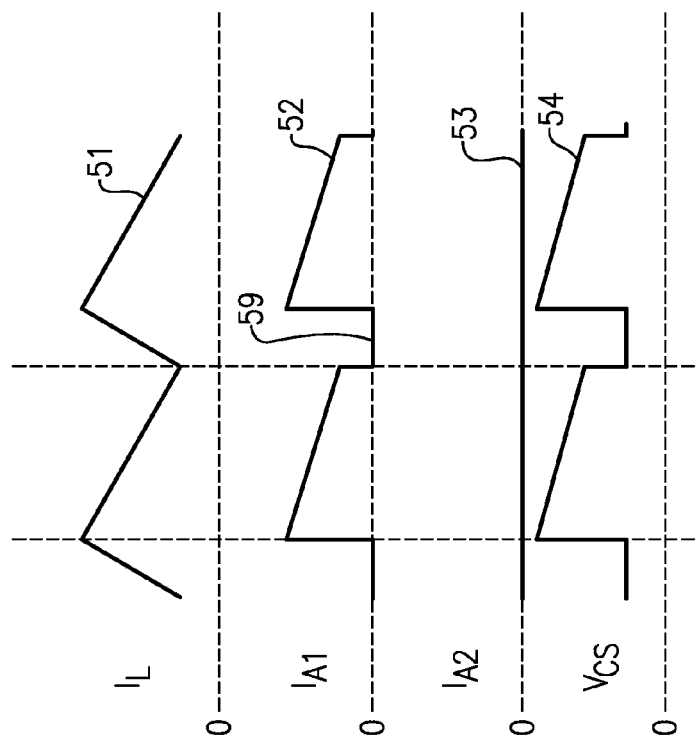

FIGS. 3A and 3B are graphs of voltage and current versus time for one implementation of the switching regulator 40 of FIG. 2. FIG. 3A corresponds to regulator operating conditions associated with positive inductor current, and includes a first plot 51 of the inductor current $I_L$ versus time, a second plot 52 of the first amplifier output current $I_{A1}$ versus time, a third plot 53 of the second amplifier output current $I_{A2}$ versus time, and a fourth plot 54 of the voltage $V_{CS}$ versus time. FIG. 3B corresponds to regulator operating conditions associated with both positive and negative inductor currents, and includes a fifth plot 55 of the inductor current $I_L$ versus time, a sixth plot 56 of the first amplifier output current $I_{A1}$ versus time, a seventh plot 57 of the second amplifier output current $I_{A2}$ versus time, and an eighth plot of the voltage $V_{CS}$ versus time.

As shown in FIG. 3A, when the inductor current $I_L$ has a positive amplitude, the second amplifier output current $I_{A2}$ can be relatively small and the first amplifier output current $I_{A1}$ can change in relation to the inductor current $I_L$. Additionally, the voltage $V_{CS}$ can change in relation to the inductor current $I_L$. As shown in FIG. 3A, the second plot 52 includes certain regions, such as region 59, in which the first amplifier current $I_{A1}$ can be substantially constant even when the inductor current $I_L$ is changing. The region 59 can be associated with the first switch transistor 1 of FIG. 2 being turned off by the first control signal CTL1 during switching operations of the regulator.

As shown in FIG. 3B, when the inductor current $I_L$ has a positive amplitude, the second amplifier output current $I_{A2}$ can relatively small and the first amplifier output current $I_{A1}$ can change in relation to the inductor current $I_L$. Additionally, when the inductor current $I_L$ has a negative amplitude, the first amplifier output current $I_{A1}$ can be relatively small and the second amplifier output current $I_{A2}$ can change in relation to the inductor current $I_L$. Additionally, the sum of the first and second amplifier output current $I_{A1}$, $I_{A2}$ can be provided to the sense resistor 12 of FIG. 2, and thus the voltage $V_{CS}$ can change in relation to the inductor current $I_L$.

Although FIGS. 3A and 3B illustrate one example of graphs of voltage and current versus time for one implementation of the switching regulator 40 of FIG. 2, other configurations are possible.

Figure 4A:
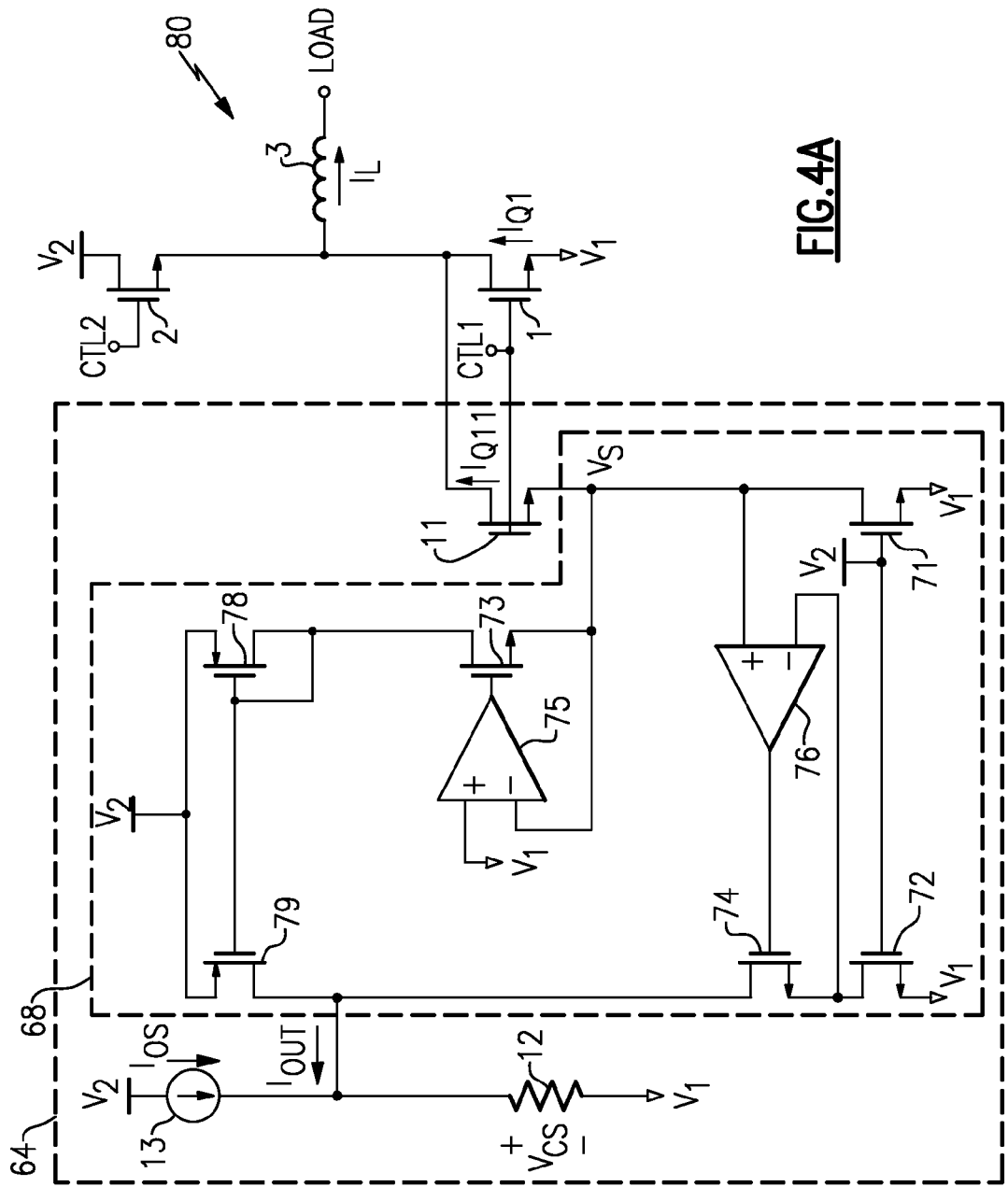
FIG. 4A is a circuit diagram of another embodiment of a switching regulator.

FIG. 4A is a circuit diagram of one embodiment of a switching regulator 80. The switching regulator 80 includes first and second switch transistors 1, 2, the load inductor 3, and a current sensing block 64. The current sensing block 64 includes the replica transistor 11, the sense resistor 12, the first current source 13, and a current sensing circuit 68, which includes first and second NMOS load transistors 71, 72, first and second NMOS control transistors 73, 74, first and second amplifiers 75, 76 and first and second PMOS transistors 78, 79.

The first current source 13 includes a first end electrically connected to the second supply voltage $V_2$ and a second end electrically connected to a first end of the sense resistor 12, to a drain of the second NMOS control transistor 74, and to a drain of the second PMOS transistor 79. The sense resistor 12 further includes a second end electrically connected to the first supply voltage $V_1$. The second NMOS control transistor 74 further includes a gate electrically connected to an output of the second amplifier 76 and a source electrically connected to an inverting input of the second amplifier 76 and to a drain of the second NMOS load transistor 72. The second NMOS load transistor 72 further includes a source electrically connected to the first power supply $V_1$ and a gate electrically connected to the second power supply $V_2$ and to a gate of the first NMOS load transistor 71. The first NMOS load transistor 71 further includes a source electrically connected to the first power supply $V_1$ and a drain electrically connected to the source of the replica transistor 11.

The first amplifier 75 includes an output electrically connected to a gate of the first NMOS control transistor 73, a non-inverting input electrically connected to the first power supply $V_1$, and an inverting input electrically connected to the source of the replica transistor 11 and to a source of the first NMOS control transistor 73. The first NMOS control transistor 73 further includes a drain electrically connected to a drain of the first PMOS transistor 78, to a gate of the first PMOS transistor 78, and to a gate of the second PMOS transistor 79. The first and second PMOS transistors 78, 79 each further include a source electrically connected to the second supply voltage $V_2$.

The current sensing block 64 can be used to generate the voltage $V_{CS}$ across the sense resistor 12 such that the voltage $V_{CS}$ changes in response to the switch current $I_{Q1}$ for both positive and negative amplitudes of the switch current $I_{Q1}$.

For example, when the switch current $I_{Q1}$ is positive or flowing from the source to drain of the first switch transistor 1, the first amplifier 75 and the first NMOS control transistor 73 can be used to control the source voltage $V_S$ of the replica transistor 11 to be about equal to a voltage of the first supply voltage $V_1$ such that the drain-to-source voltages of the first switch transistor 1 and the replica transistor 11 are about equal. Additionally, the sense current $I_{Q11}$ can flow though the first NMOS control transistor 73 and be mirrored by the first and second PMOS transistors 78, 79, which operate as a current mirror, to generate the output current $I_{OUT}$. In addition, when the switch current $I_{Q1}$ is positive, the voltage at the node $V_S$ will be about equal to the first supply voltage $V_1$ due to the operation of the feedback loop with the first amplifier 75, and the feedback loop associated with the second amplifier 76 can bias the gate of the second NMOS control transistor 74 to be off. Although the first and second PMOS transistors 78, 79 illustrate one example of a current mirror that can be used in the switching regulators described herein, other configurations are possible.

Additionally, when the switch current $I_{Q1}$ is negative or flowing from the drain to source of the first switch transistor 1, the sense current $I_{Q11}$ can flow through the first NMOS load transistor 71 to generate a voltage at the non-inverting input of the second amplifier 76. Additionally, the second amplifier 76 can control the voltage of the gate of the second NMOS control transistor 74 such that the voltages of the second amplifier's non-inverting and inverting inputs are about equal. In such a configuration, the output current $I_{OUT}$ can be about equal to the sense current $I_{Q11}$ multiplied by a scaling factor M, which can be based on a ratio of the width of the first NMOS load transistor 71 relative to a width of the second NMOS load transistor 72. The scaling factor M can be greater than, less than, or equal to 1. However, when the switch current $I_{Q1}$ is negative, the first NMOS control transistor 73 can be off, since the first NMOS control transistor 73 has been configured to source but not to sink current to the node $V_S$.

The channel resistance of the first NMOS load transistor 71 can be configured to be relatively small compared to the channel resistance of the replica transistor 11 such that the drain-to-source voltages of the first switch transistor 1 and the replica transistor 11 are about equal when the switch current $I_{Q1}$ is negative. For example, in one embodiment, the channel resistance of the first NMOS load transistor 71 has a channel resistance that is at least about 10 times less than a channel resistance of the replica transistor 11. Although one example of resistance values has been given, other configurations are possible.

Figure 4B:
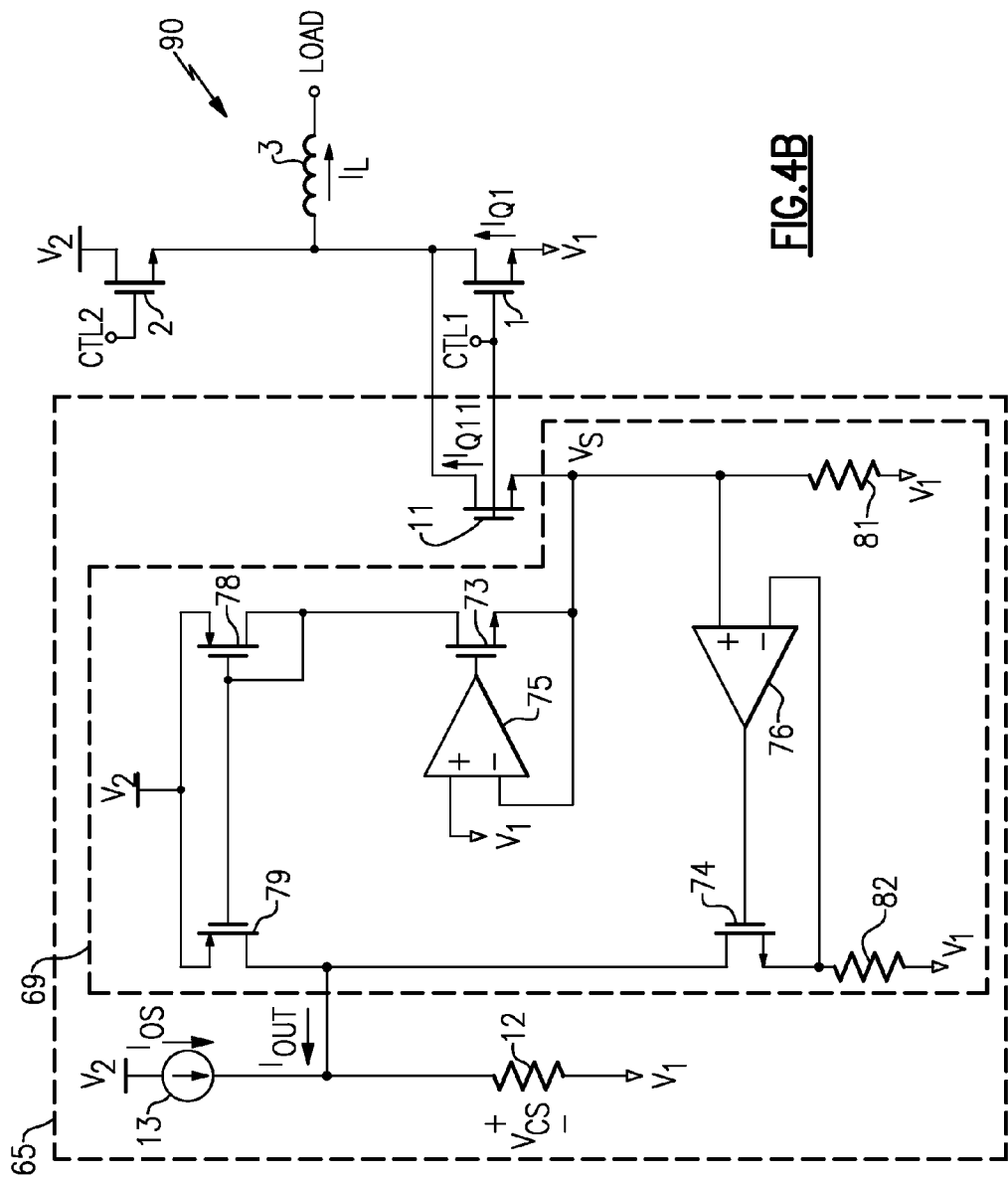
FIG. 4B is a circuit diagram of another embodiment of a switching regulator.

FIG. 4B is a circuit diagram of one embodiment of a switching regulator 90. The switching regulator 90 includes first and second switch transistors 1, 2, the load inductor 3, and a current sensing block 65. The current sensing block 65 includes the replica transistor 11, the sense resistor 12, the first current source 13, and a current sensing circuit 69, which includes first and second load resistors 81, 82, the first and second NMOS control transistors 73, 74, the first and second amplifiers 75, 76 and the first and second PMOS transistors 78, 79.

The switching regulator 90 of FIG. 4B is similar to the switching regulator 80 of FIG. 4A, except that the switching regulator 90 of FIG. 4B uses a different configuration of load circuits. For example, in contrast to the switching regulator 80 of FIG. 4A which includes the first and second NMOS load transistors 71, 72 as loads, the switching regulator 90 of FIG. 4B includes the first and second load resistors 81, 82. For example, the first load resistor 81 is electrically connected between the non-inverting input of the second amplifier 76 and the first power supply $V_1$, and the second load resistor 82 is electrically connected between the inverting input of the second amplifier 76 and the first power supply $V_1$. Additional details of the switching regulator 90 can be similar to those described earlier.

The resistance of the first load resistor 81 can be configured to be relatively small compared to the channel resistance of the replica transistor 11 such that the drain-to-source voltages of the first switch transistor 1 and the replica transistor 11 are about equal when the switch current $I_{Q1}$ is negative. For example, in one embodiment, the resistance of the first load resistor 81 is at least about 10 times less than a channel resistance of the replica transistor 11. Although one example of resistance values has been given, other configurations are possible.

Figure 5:
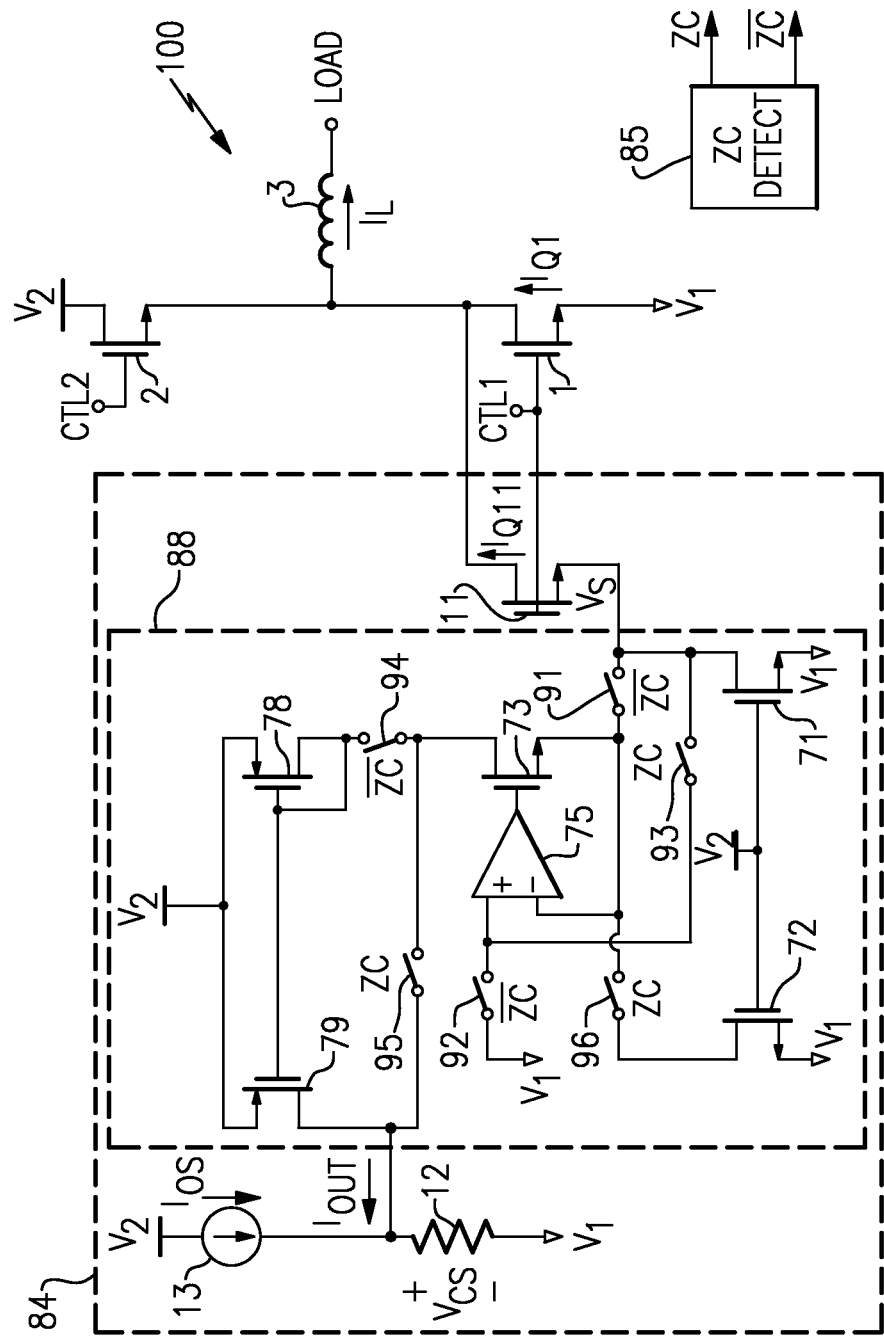
FIG. 5 is a circuit diagram of another embodiment of a switching regulator.

FIG. 5 is a circuit diagram of another embodiment of a switching regulator 100. The switching regulator 100 includes the first and second switch transistors 1, 2, the load inductor 3, a current sensing block 84, and a zero-cross detection circuit 85. The current sensing block 84 includes the replica transistor 11, the sense resistor 12, the first current source 13, and a current sensing circuit 88, which includes the first and second NMOS load transistors 71, 72, the first NMOS control transistor 73, the first amplifier 75, the first and second PMOS transistors 78, 79, and first to sixth switches 91-96.

The zero-cross detection circuit 85 is configured to generate a first or non-inverted zero-cross control signal and a second or inverted zero-cross control signal. The non-inverted zero-cross control signal can indicate that the inductor current $I_L$ is negative or flowing out of the load terminal LOAD, while the inverted zero-cross control signal can indicate that the inductor current $I_L$ is positive or flowing into the load terminal LOAD.

The first current source 13 includes a first end electrically connected to the second supply voltage $V_2$ and a second end electrically connected to a first end of the sense resistor 12, to a drain of the second PMOS transistor 79, and to a first end of the fifth switch 95. The sense resistor 12 further includes a second end electrically connected to the first supply voltage $V_1$. The fifth switch 95 further includes a control input configured to receive the non-inverted zero-cross control signal and a second end electrically connected to a drain of the first NMOS control transistor 73 and to a first end of the fourth switch 94. The fourth switch 94 further includes a control input configured to receive the inverted zero-cross control signal and a second end electrically connected to a drain of the first PMOS transistor 78, to a gate of the first PMOS transistor 78, and to a gate of the second PMOS transistor 79. The first and second PMOS transistors 78, 79 each further include a source electrically connected to the second supply voltage $V_2$. The first NMOS control transistor 73 further includes a gate electrically connected to an output of the first amplifier 75 and a source electrically connected to an inverted input of the first amplifier 75, to a first end of the first switch 91, and to a first end of the sixth switch 96. The first amplifier 75 further includes a non-inverting input electrically connected to a first end of the second switch 92 and to a first end of the third switch 93.

The first switch 91 further includes a control input configured to receive the inverted zero-cross control signal and a second end electrically connected to the source of the replica transistor 11, to a second end of the third switch 93, and to a drain of the first NMOS load transistor 71. The second switch 92 further includes a control input configured to receive the inverted zero-cross control signal and a second end electrically connected to the first supply voltage $V_1$. The third switch 93 further includes a control input configured to receive the non-inverted zero-cross control signal. The sixth switch 96 further includes a control input configured to receive the non-inverted zero-cross control signal and a second end electrically connected to a drain of the second NMOS load transistor 72. The second NMOS load transistor 72 further includes a source electrically connected to the first supply voltage $V_1$ and a gate electrically connected to the second supply voltage $V_2$ and to a gate of the first NMOS load transistor 71. The first NMOS load transistor 71 further includes a source electrically connected to the first supply voltage $V_1$.

As persons having ordinary skill in the art will appreciate, the zero-cross detection circuit 85 can be included in a switching regulator to control the timing of the regulator's switching operations. In the configuration illustrated in FIG. 5, the zero-cross detection circuit 85 has been advantageously used to also control the first to sixth switches 91-96 of the current sensing block 84 so as to reduce a number of amplifiers used in the current sensing block 84 of FIG. 5 relative to the current sensing block 64 of FIG. 4A.

For example, when the switch current $I_{Q1}$ is positive, the third, fifth, and sixth switches 93, 95, 96 can be opened or turned off and the first, second and fourth switches 91, 92, 94 can be closed or turned on, thereby electrically connecting the first amplifier's non-inverting input to the first supply voltage $V_1$, electrically connecting the first amplifier's inverting input to the source of the replica transistor 11, and electrically connecting the drain of the first NMOS control transistor 73 to the gate and drain of the first PMOS transistor 78 and to the gate of the second PMOS transistor 79. Thus, when the switch current $I_{Q1}$ is positive, the first amplifier 75 and the first NMOS control transistor 73 can be used to control the source voltage $V_S$ of the replica transistor 11 to be about equal to a voltage of the first supply voltage $V_1$, such that the sense current $I_{Q11}$ changes in relation to the switch current $I_{Q1}$. Additionally, the sense current $I_{Q11}$ can flow though the first NMOS control transistor 73 and can be mirrored by the first and second PMOS transistors 78, 79 to generate the output current $I_{OUT}$.

However, when the switch current $I_{Q1}$ is negative, the first, second and fourth switches 91, 92, 94 can be opened and the third, fifth, and sixth switches 93, 95, 96 can be closed, thereby electrically connecting the first amplifier's non-inverting input to the drain of the first NMOS load transistor 71, electrically connecting the first amplifier's inverting input to the drain of the second NMOS load transistor 72, and electrically connecting the drain of the first NMOS control transistor 73 to the first end of the sense resistor 12. In this operating condition, the sense current $I_{Q11}$ can flow through the first NMOS load transistor 71 and the first amplifier 75 can control the gate of the first NMOS control transistor 73 such that the voltages of the first amplifier's non-inverting and inverting inputs are about equal. Additionally, a replica of the sense current $I_{Q11}$ can flow though the second NMOS load transistor 72 and the first NMOS control transistor 73 to generate the output current $I_{OUT}$.

Additional details of the switching regulator 100 of FIG. 5 can be similar to those described earlier.

The foregoing description and claims may refer to elements or features as being "connected" or "coupled" together. As used herein, unless expressly stated otherwise, "connected" means that one element/feature is directly or indirectly connected to another element/feature, and not necessarily mechanically. Likewise, unless expressly stated otherwise, "coupled" means that one element/feature is directly or indirectly coupled to another element/feature, and not necessarily mechanically. Thus, although the various schematics shown in the figures depict example arrangements of elements and components, additional intervening elements, devices, features, or components may be present in an actual embodiment (assuming that the functionality of the depicted circuits is not adversely affected).

APPLICATIONS

Devices employing the above described schemes can be implemented into various electronic devices. Examples of the electronic devices can include, but are not limited to, consumer electronic products, parts of the consumer electronic products, electronic test equipment, medical electronic products, etc. Examples of the electronic devices can also include memory chips, memory modules, circuits of optical networks or other communication networks, and disk driver circuits. The consumer electronic products can include, but are not limited to, a mobile phone, a telephone, a television, a computer monitor, a computer, a hand-held computer, a personal digital assistant (PDA), a microwave, a refrigerator, an automobile, a stereo system, a cassette recorder or player, a DVD player, a CD player, a VCR, an MP3 player, a radio, a camcorder, a camera, a digital camera, a portable memory chip, a washer, a dryer, a washer/dryer, a copier, a facsimile machine, a scanner, a multi functional peripheral device, a wrist watch, a clock, etc. The medical electronic products can include, but are not limited to, a Digital-X-ray detector, a CT (Computed Tomography) scanner, an Ultrasounds system, a MRI (Magnetic Resonance Imaging) system, etc. Further, the electronic device can include unfinished products.

Although this invention has been described in terms of certain embodiments, other embodiments that are apparent to those of ordinary skill in the art, including embodiments that do not provide all of the features and advantages set forth herein, are also within the scope of this invention. Moreover, the various embodiments described above can be combined to provide further embodiments. In addition, certain features shown in the context of one embodiment can be incorporated into other embodiments as well. Accordingly, the scope of the present invention is defined only by reference to the appended claims.

What is claimed is:

1. An apparatus comprising:
a first switch transistor including a drain, a source, and a gate, wherein the source is electrically connected to a first supply voltage, and wherein the gate is electrically connected to a first control signal;
a replica transistor including a drain, a source, and a gate, wherein the drain of the replica transistor is electrically connected to the drain of the first switch transistor, wherein the gate of the replica transistor is electrically connected to the first control signal, and wherein the replica transistor is a replica of the first switch transistor; and
a current sensing circuit electrically connected to the source of the replica transistor, wherein the current sensing circuit is configured to control a voltage of the source of the replica transistor such that a sense current through the replica transistor varies in response to a switch current through the first switch transistor, wherein the current sensing circuit is further configured to source the sense current to generate a first current that varies in response to the switch current when the switch current has a first polarity, and wherein the current sensing circuit is further configured to sink the sense current to generate a second current that varies in response to the switch current when the switch current has a second polarity opposite the first polarity.

2. The apparatus of claim 1, further comprising a sense resistor, wherein the current sensing circuit is configured to sum the first and second currents to generate an output current, wherein the sense resistor is configured to receive the output current from the current sensing circuit, and wherein a voltage across the sense resistor is configured to change in relation to the switch current.

3. The apparatus of claim 2, further comprising:
a first current source configured to generate an offset current, wherein the sense resistor is further configured to receive the offset current from the first current source.

4. The apparatus of claim 1, wherein the current sensing circuit comprises:
a first amplifier including a first input, a second input, and an output, wherein the first input is electrically connected to the first supply voltage, wherein the second input and the output are electrically connected to the source of the replica transistor, and wherein the output of the first amplifier is configured to generate the first current;
a second amplifier including a first input, a second input, and an output, wherein the first input of the second amplifier is electrically connected to the source of the replica transistor, wherein the output of the second amplifier is electrically connected to the second input of the second amplifier, and wherein the output of the second amplifier is configured to generate the second current;
a first load circuit electrically connected between the first input of the second amplifier and the first supply voltage; and
a second load circuit electrically connected between the second input of the second amplifier and the first supply voltage,
wherein the first amplifier is configured to source the sense current through the replica transistor when the switch current has the first polarity, and
wherein the first load circuit is configured to sink the sense current through the replica transistor when the switch current has the second polarity.

5. The apparatus of claim 4,
wherein the first load circuit comprises a first load resistor electrically connected between the first input of the second amplifier and the first supply voltage, and
wherein the second load circuit comprises a second load resistor electrically connected between the second input of the second amplifier and the first supply voltage.

6. The apparatus of claim 4,
wherein the first load circuit comprises a first n-type metal oxide semiconductor (NMOS) load transistor including a source electrically connected to the first supply voltage, a gate electrically connected to a second supply voltage and a drain electrically connected to the first input of the second amplifier, and
wherein the second load circuit comprises a second NMOS load transistor including a source electrically connected to the first supply voltage, a gate electrically connected to the second supply voltage and a drain electrically connected to the second input of the second amplifier.

7. The apparatus of claim 4, further comprising:
a first current source configured to generate a first current source current that changes in relation to the first current from the output of the first amplifier; and
a second current source configured to generate a second current source current that changes in relation to the second current from the output of the second amplifier,
wherein the first and second current source currents are summed to generate an output current of the current sensing circuit.

8. The apparatus of claim 1, further comprising:
a second switch transistor including a drain, a source, and a gate, wherein the source is electrically connected to the drain of the first switch transistor, wherein the drain is electrically connected to a second supply voltage, and wherein the gate is electrically connected to a second control signal.

9. The apparatus of claim 1, further comprising:
an inductor electrically connected between a load terminal and the drain of the first switch transistor.

10. The apparatus of claim 1, wherein the current sensing circuit comprises:
a current minor including an input and an output, wherein the sense resistor is electrically connected between the output of the current minor and the first supply voltage;
a first amplifier including a first input, a second input, and an output, wherein the first input is electrically connected to the first supply voltage, and wherein the second input is electrically connected to the source of replica transistor;
a first NMOS control transistor including a gate electrically connected to the output of the first amplifier, a source electrically connected to the second input of the first amplifier, and a drain electrically connected to the input of the current mirror.

11. The apparatus of claim 10, wherein the current sensing circuit further comprises:
- a second amplifier including a first input, a second input, and an output, wherein the first input of the second amplifier is electrically connected to the source of the replica transistor;
- a first load circuit electrically connected between the first input of the second amplifier and the first supply voltage;
- a second load circuit electrically connected between the second input of the first amplifier and the first supply voltage;
- a second NMOS control transistor including a drain, a source, and a gate, wherein the gate of the second control NMOS transistor is electrically connected to the output of the second amplifier, wherein the source of the second NMOS control transistor is electrically connected to the second input of the second amplifier, and wherein the sense resistor is electrically connected between the drain of the second NMOS control transistor and the first supply voltage.

12. The apparatus of claim 1, wherein the current sensing circuit further comprises:
- a current minor including an input and an output, wherein the sense resistor is electrically connected between the output of the current minor and the first supply voltage;
- a first NMOS control transistor including a gate, a source, and a drain;
- a first amplifier including a first input, a second input, and an output, wherein the output is electrically connected to gate of the first NMOS control transistor;
- a first load circuit electrically connected between the source of the replica transistor and the first supply voltage;
- a first control switch electrically connected in a first electrical path between the second input of the first amplifier and the source of the replica transistor;
- a second control switch electrically connected in a second electrical path between the first input of the first amplifier and the first supply voltage,
- a third control switch electrically connected in a third electrical path between the first input of the first amplifier and the source of the replica transistor;
- a fourth control switch electrically connected in a fourth electrical path between the drain of the first NMOS control transistor and the input of the current minor;
- a fifth control switch electrically connected in a fifth electrical path between the drain of the first NMOS control transistor and the output of the current mirror;
- a sixth control switch; and
- a second load circuit, wherein the sixth control switch and the second load circuit and electrically connected in series in a sixth electrical path between the second input of the first amplifier and the first supply voltage,
- wherein the first, second and fourth switches are configured to turn on when the switch current has the first polarity and to turn off when the switch current has the second polarity, and wherein the third, fifth, and sixth switches are configured to turn on when the switch current has the second polarity and to turn off when the switch current has the first polarity.

13. A method of current sensing in a switching regulator, the method comprising:
- controlling a first switch transistor using a first control signal, wherein the first switch transistor includes a drain, a source electrically connected to a first supply voltage, and a gate electrically connected to the first control signal;
- controlling a voltage of a source of a replica transistor using a current sensing circuit, wherein the replica transistor includes a drain electrically connected to the drain of the first switch transistor and a gate electrically connected to the gate of the first switch transistor;
- sourcing a sense current through the replica transistor using the current sensing circuit when a switch current through the first switch transistor has a first polarity;
- generating a first current using the current sensing circuit, wherein the first current varies in response to the switch current when the switch current has the first polarity;
- sinking the sense current using the current sensing circuit when the switch current has a second polarity opposite the first polarity; and
- generating a second current using the current sensing circuit, wherein the second current varies in response to the switch current when the switch current has the second polarity.

14. The method of claim 13, further comprising:
- summing the first and second currents to generate an output current using the current sensing circuit; and
- generating a sense voltage across a sense resistor using the output current, wherein a voltage across the sense resistor changes in relation to the switch current.

15. The method of claim 14, further comprising:
- generating an offset current using a first current source; and
- providing the offset current to the sense resistor to shift a voltage level of the sense voltage.

16. The method of claim 13, wherein controlling the voltage of the source of the replica transistor comprises controlling a drain-to-source voltage of the replica transistor to be about equal to a drain-to-source voltage of the first switch transistor.

17. The method of claim 13, wherein sourcing the sense current comprises generating the sense current using a first amplifier, wherein the first amplifier includes a first input, a second input, and an output, wherein the first input is electrically connected to the first supply voltage, and wherein the second input and the output are electrically connected to the source of the replica transistor.

18. The method of claim 17, wherein sinking the sense current comprises sinking the sense current using a first load circuit, wherein the first load circuit is electrically connected between the source of the replica transistor and the first supply voltage.

19. The method of claim 18, further comprising controlling a voltage across a second load circuit using a second amplifier, wherein the second amplifier includes a first input, a second input, and an output, wherein the first input of the second amplifier is electrically connected to the source of the replica transistor, wherein the output of the second amplifier is electrically connected to the second input of the second amplifier, wherein the second load circuit is electrically connected between the second input of the second amplifier and the first power supply, wherein the first current is based on a current from the output of the first amplifier, and wherein the second current is based on a current from the output of the second amplifier.

20. An apparatus comprising:
- a first switch transistor including a drain, a source, and a gate, wherein the source is electrically connected to a first supply voltage, and wherein the gate is electrically connected to a first control signal;

a replica transistor including a drain, a source, and a gate, wherein the drain of the replica transistor is electrically connected to the drain of the first switch transistor, wherein the gate of the replica transistor is electrically connected to the first control signal, and wherein the replica transistor is a replica of the first switch transistor;

a current sensing circuit comprising:

a first feedback circuit configured to generate a first current to control a voltage of the source of the replica transistor when a switch current through the first switch transistor has a first polarity, wherein the first feedback circuit is further configured to control the voltage of the source of the replica transistor to at least approximately match a voltage of the first supply voltage when the switch current has the first polarity, and wherein the first feedback current is further configured to source a sense current through the replica transistor when the switch current has the first polarity;

a first load having a first end electrically connected to the source of the replica transistor and a second end electrically connected to the first supply voltage, wherein the first load is configured to sink the sense current when the switch current has a second polarity opposite the first polarity;

a second load having a predetermined scale relative to the first load, the second load having a first end and a second end, wherein the second end is electrically connected to the first supply voltage; and a second feedback circuit configured to generate a second current to drive the second load with a buffered version of the voltage of the source of the replica transistor, wherein the current sensing circuit is further configured to combine a first signal associated with the first current and a second signal associated with the second current such that the switch current is sensed bidirectionally.

* * * * *

UNITED STATES PATENT AND TRADEMARK OFFICE
CERTIFICATE OF CORRECTION

PATENT NO. : 8,937,467 B2  Page 1 of 1
APPLICATION NO. : 13/791210
DATED : January 20, 2015
INVENTOR(S) : Song Qin It is certified that error appears in the above-identified patent and that said Letters Patent is hereby corrected as shown below:

In the Specification

In column 7 at line 47, change "$\alpha^*_{A1}$" to --$\alpha^*I_{A1}$--.

In column 7 at line 49, change "$a^*I_{A2}$," to --$\alpha^*I_{A2}$,--.

In column 10 at line 36, change "$I_{AZ}$" to --$I_{A2}$--.

In the Claims

In column 16 at line 58, in Claim 10, change "minor" to --mirror--.

In column 16 at line 60, in Claim 10, change "minor" to --mirror--.

In column 17 at line 26, in Claim 12, change "minor" to --mirror--.

In column 17 at line 28, in Claim 12, change "minor" to --mirror--.

In column 17 at line 48, in Claim 12, change "minor;" to --mirror;--.

Signed and Sealed this
Twenty-second Day of September, 2015

Michelle K. Lee
*Director of the United States Patent and Trademark Office*